United States Patent Office 2,694,223
Patented Nov. 16, 1954

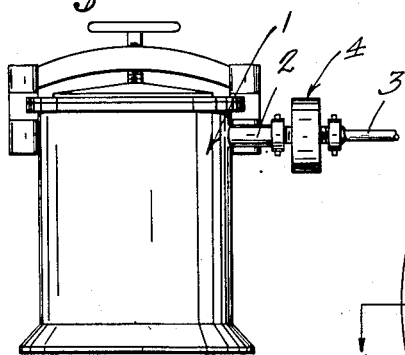
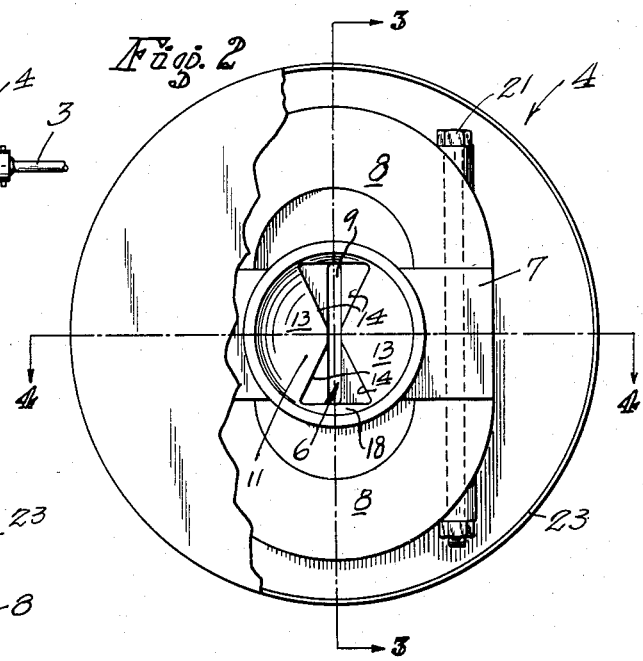
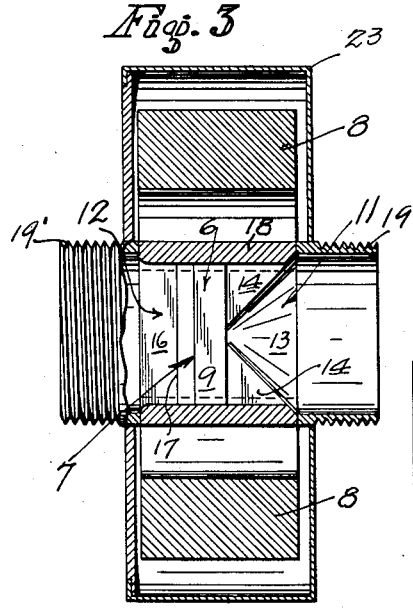
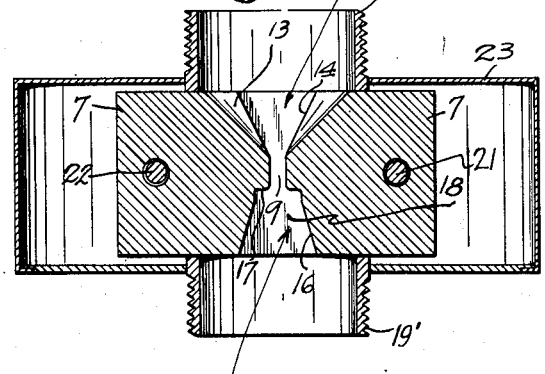
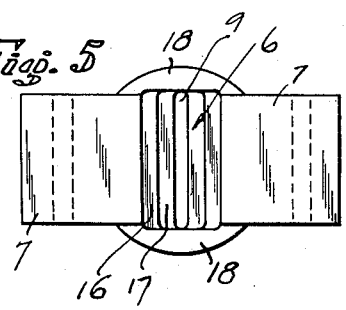
INVENTOR.
DONALD E. STEM
BY George B. White

2,694,223

METHOD FOR TRAPPING MAGNETIC PARTICLES

Donald E. Stem, San Francisco, Calif.

Original application May 24, 1949, Serial No. 96,066, now Patent No. 2,619,674, dated December 2, 1952. Divided and this application April 5, 1952, Serial No. 280,781

2 Claims. (Cl. 17—45)

This invention relates to a method for trapping magnetic particles, and particularly to such method in so called sausage stuffing. This application is a division of my copending application Ser. No. 96,066, filed May 24, 1949, now Patent No. 2,619,674, issued December 2, 1952, for magnetic trapping device.

The primary object of this invention is to provide a method of trapping metallic particles from a material by passing the material under pressure through a passage and creating around said passage a very intense magnetic field, the most effective portion of which surrounds said passage.

Another object of this invention is to provide, in sausage stuffing or the like, a method of trapping metallic particles by directing the flow of sausage mix under pressure through a continuous closed passage, and creating a strong magnetic field across said passage, preferably at a restricted portion thereof, and utilizing said pressure for stuffing the cleared sausage mix into a sausage casing.

With the foregoing and other objects in view, which will be made manifest in the following detailed description, reference is had to the accompanying drawings, wherein:

Fig. 1 is a side view of a sausage stuffing apparatus with my magnetic trap assembled therein.

Fig. 2 is a face view, partly broken away of my magnetic trap, on an enlarged scale.

Fig. 3 is a sectional view of my magnetic trap, the section being taken on the lines 3—3 of Fig. 2.

Fig. 4 is a sectional view of my magnetic trap, the section being taken on the lines 4—4 of Fig. 2, and Fig. 5 is a view of the magnetic body of my trap viewing the outlet end of the passage.

In general my method includes the pressing of sausage mix or the like through an intense magnetic field on its way to the stuffing horn. Particularly, my method includes the use of the stuffing pressure for forcing the stuffing mix through a passage formed through a magnetic body so that it is across a comparatively intense magnetic field.

In detail, the sausage mix is passed through a continuous closed passage under pressure. A portion of said passage is preferably restricted. The passage is continuous to a suitable stuffing horn. A constant, intense magnetic field is created around and across said restricted portion of said passage, so as to trap metallic particles from the sausage mix. The same pressure on said mix is utilized to expell the cleared sausage mix from said horn into the usual casing. Said magnetic field is created by interconnecting a magnetic body as part of said passage, preferably as said restricted part of said passage and providing a permanent magnet on said magnetic body.

My illustrative structure to carry out my method includes a sausage mix pressing and feeding device 1, the feed conduit 2 of which normally leads to a horn 3, on which latter the usual casing, not shown, is held to be stuffed. My magnetic trap 4 is interconnected between said device and said horn 3 at any selected point so that the sausage mix is compelled to pass through the passage of the magnetic trap, subject to an intense magnetic field.

My magnetic trap, in detail, includes a magnetic body 7 with the passage 6 formed therethrough, and powerful permanent magnets 8 mounted on opposite sides of said magnetic body 7. The passage 6 divides the body 7 into two separate sections forming pole pieces on the opposite sides of said passage 6.

The passage 6, in the herein illustration, is formed by an elongated slit 9, substantially diametrical, or transverse, to the conduits connected to the magnet. An intake chamber 11 is formed on one side of the slit 9 and an outlet chamber 12 at the opposite end of the slit 9. The inlet chamber 11 is adapted to direct the flow to the most intense portions of the magnetic field through said slit 9. The inlet chamber 11 has generally frusto conical side segments 13 which merge into opposed plane sides 14 diverging from the middle outwardly and oppositely toward opposite ends of the slit 9. Thus the flow is directed toward the middle of the slit 9.

The outlet chamber 12 has outwardly flaring sides 16, and a shoulder 17 formed at each edge of the slit 9 at the base of each outlet side 16. The magnetic particles that may be swept through the slit 9 are swept over said shoulders 17, which latter form pockets at the opposite sides of the flow to retain such metallic particles in the magnetic field.

The sections or pole pieces of the magnetic body 7 are held together by non-magnetic connecting cylinder segments 18, welded across the top and bottom of the passage 6 as shown in Figs. 3 and 5, so as to fixedly hold said sections or pole pieces together around said passage 6. Non-magnetic threaded conduits 19 and 19' are respectively welded to the inlet end and the outlet end of said cylinder segments 18 and to the adjacent portions of the body 7 for connection by suitable couplings to the conduits 2 for the flow of mix or material handled.

The completed unit, therefore, forms a generally tubular conduit of two spaced non magnetic sections 19 and 19', and the magnetic body 7 held between said conduit sections 19 and 19' so that it forms a third conduit section to permit the passage of the sausage mix through said sections and the trapping of magnetic particles during said passage.

The pole pieces or body 7 are magnetized by permanent magnets 8 mounted by suitable bolts 21 and on opposite sides of the body 7.

The entire unit is covered by suitable non-magnetic covering 23.

The cleaning and removal of trapped particles from the magnetized passage is accomplished easily by pushing a non-magnetic spatula through said passage 6 so as to push the particles to the outer fringes of the passage from where the particles can be lifted manually or by suitable non-magnetic tweezers or pliers.

The integrally united parts of the conduits have their inner exposed surfaces suitably finished to form smooth, sanitary passages without cracks. Thus the sausage mix is pressed through a continuous smooth passage exposed to said magnetic field without presenting any opportunity for bacterial accumulation.

I claim:

1. In sausage making and the like, the steps of directing under pressure comminuted filling material through an intense magnetic field to trap metallic particles from said material and conveying the cleared material under the same pressure for further processing.

2. In sausage making and the like, the steps of directing under pressure comminuted filling material through an intense magnetic field, restricting the cross section of said material as it passes through said magnetic field and conveying the cleared material under the same pressure for further processing.

References Cited in the file of this patent

UNITED STATES PATENTS

| Number | Name | Date |
|---|---|---|
| 1,317,992 | Sekinger | Oct. 7, 1919 |
| 2,436,740 | Brooks | Feb. 24, 1948 |